United States Patent
Yang et al.

(10) Patent No.: US 8,976,668 B2
(45) Date of Patent: Mar. 10, 2015

(54) METHOD AND APPARATUS FOR OPTIMIZING A USER PLAN OPERATION IN A COMMUNICATION SYSTEM BASED ON CARRIER AGGREGATION

(75) Inventors: Tao Yang, PuDong Jinqiao Shanghai (CN); Pingping Wen, PuDong Jinqiao Shanghai (CN)

(73) Assignee: Alcatel Lucent, Boulogne-Billancourt (FR)

( * ) Notice: Subject to any disclaimer, the term of this patent is extended or adjusted under 35 U.S.C. 154(b) by 97 days.

(21) Appl. No.: 13/704,046

(22) PCT Filed: Jun. 21, 2011

(86) PCT No.: PCT/IB2011/001764
§ 371 (c)(1),
(2), (4) Date: Dec. 13, 2012

(87) PCT Pub. No.: WO2011/161538
PCT Pub. Date: Dec. 29, 2011

(65) Prior Publication Data
US 2013/0089058 A1    Apr. 11, 2013

(30) Foreign Application Priority Data

Jun. 21, 2010  (CN) .......................... 2010 1 0204956

(51) Int. Cl.
*H04J 1/16*  (2006.01)
*H04W 4/00*  (2009.01)

(52) U.S. Cl.
USPC .......................................... 370/236; 370/328

(58) Field of Classification Search
USPC ................. 370/236, 329, 394, 412, 328, 338
See application file for complete search history.

(56) References Cited

U.S. PATENT DOCUMENTS

| | | |
|---|---|---|
| 2006/0190610 A1 | 8/2006 | Motegi et al. |
| 2008/0225765 A1 | 9/2008 | Marinier et al. |

(Continued)

FOREIGN PATENT DOCUMENTS

| | | |
|---|---|---|
| EP | 1 755 355 A1 | 2/2007 |
| JP | 2006217085 A | 8/2006 |

(Continued)

OTHER PUBLICATIONS

Infineon Technologies, "Clarification to handling of MAC-ehs entity in case of secondary serving HS-DSCH cell deactivation and reactivation," $3^{rd}$ Generation Partnership Project (3GPP), 3GPP TSG-RAN WG2 Meeting #68, R2-096554, XP050390633, 4 pages, Jeju, Rep. Korea, Nov. 9-13, 2009.

(Continued)

*Primary Examiner* — Andrew Lee
(74) *Attorney, Agent, or Firm* — Fay Sharpe LLP (57) ABSTRACT

A method and an apparatus for optimizing a user plan operation in a wireless communication system based on carrier aggregation are provided in the present invention. Firstly, a user equipment receives a downlink carrier component removal signaling from a base station, the downlink carrier component removal signaling is used to indicate a removed downlink carrier component; then, the user equipment, according to the received downlink carrier component removal signaling, stops the pending HARQ procedures of the removed downlink carrier component and flushes the HARQ receiving buffer related to the removed downlink carrier component and/or stops a re-ordering procedure and/or generates a status report and sends the status report to the base station, wherein the status report is used to indicate the base station to perform retransmission and inform the base station of the data needed to be retransmitted. By applying the technology scheme of the present invention, the user plan operation at the user equipment side can be optimized, when a downlink carrier component is de-activated or de-configured.

15 Claims, 4 Drawing Sheets

(56) References Cited

U.S. PATENT DOCUMENTS

| | | | |
|---|---|---|---|
| 2009/0268683 | A1 | 10/2009 | Ho et al. |
| 2009/0296643 | A1* | 12/2009 | Cave et al. .................... 370/329 |
| 2010/0015967 | A1 | 1/2010 | Perets et al. |
| 2010/0130219 | A1* | 5/2010 | Cave et al. .................... 455/450 |
| 2011/0103326 | A1* | 5/2011 | Kim et al. ..................... 370/329 |
| 2011/0274057 | A1* | 11/2011 | Kuo .............................. 370/329 |
| 2011/0292894 | A1* | 12/2011 | Wu ................................ 370/329 |
| 2012/0057490 | A1* | 3/2012 | Park et al. ..................... 370/252 |
| 2012/0069802 | A1* | 3/2012 | Chen et al. .................... 370/329 |
| 2012/0300716 | A1* | 11/2012 | Jersenius et al. ............. 370/329 |
| 2013/0039202 | A1* | 2/2013 | Feuersanger et al. ......... 370/252 |
| 2013/0051341 | A1* | 2/2013 | Suzuki et al. ................. 370/329 |

FOREIGN PATENT DOCUMENTS

| | | |
|---|---|---|
| JP | 2010/521881 A | 6/2010 |
| JP | 2011/521537 A | 7/2011 |
| JP | 2011/528523 A | 11/2011 |
| JP | 2012-508531 A | 4/2012 |
| WO | WO 2009/132290 A2 | 10/2009 |
| WO | WO 2009/134806 A2 | 11/2009 |
| WO | WO 2010/007562 A2 | 1/2010 |
| WO | WO 2010/054376 A1 | 5/2010 |

OTHER PUBLICATIONS

ZTE, "DRX and activation/deactivation," 3$^{rd}$ Generation Partnership Project (3GPP), 3GPP TSG RAN WG2 #69bis, R2-102177, XP050422587, pp. 1-4, Beijing, China, Apr. 12-16, 2010.

LG Electronics, "Component carrier types and the corresponding characteristics," 3GPP TSG RAN WG1#56bis, R1-091200, XP050338815, pp. 1-4, Seoul, Korea, Mar. 23-27, 2009.

MediaTek Inc., "Primary Component Carrier Management," 3$^{rd}$ Generation Partnership Project (3GPP), 3GPP TSG-RAN WG2#69bis, R2-102214, XP050422719, pp. 1-4, Beijing, China, Apr. 12-16, 2010.

Motorola, "Change of Primary Component Carrier," 3$^{rd}$ Generation Partnership Project (3GPP), 3GPP TSG-RAN WG2#69bis, R2-102346, XP050422645, pp. 1-2, Beijing, China, Apr. 12-16, 2010.

Alcatel-Lucent et al., "Fast Primary Carrier Change in 4C-HSDPA," 3$^{rd}$ Generation Partnership Project (3GPP), 3GPP TSG-RAN WG1 Meeting #60bis, R1-101841, XP050419667, 2 pages, Beijing, China, Apr. 12-16, 2010.

LG Electronics Inc., "De-activation/Re-activation of Secondary Carrier," 3$^{rd}$ Generation Partnership Project (3GPP), 3GPP TSG RAN WG2 Meeting #68, R2-096879, XP050391294, 2 pages, Jeju, South Korea, Nov. 9-13, 2009.

Intel Corporation Ltd., "Clarification on CC Configuration Terminology and Scope," 3$^{rd}$ Generation Partnership Project (3GPP), 3GPP TSG RAN WG2 Meeting #69bis, R2-102352, XP050422646, 4 pages, Beijing, China, Apr. 12-16, 2010.

Samsung, "Handling of linkage between UL CC and deactivated DL CC," 3$^{rd}$ Generation Partnership Project (3GPP), 3GPP TSG RAN WG1 Meeting #61, R1-102995, XP050420101, 3 pages, Montreal, Canada, May 10-14, 2010.

International Search Report for PCT/IB2011/001764 dated Jun. 1, 2012.

Samsung, "Handling of linkage between UL CC and deactivated DL CC," 3$^{rd}$ Generation Partnership Project (3GPP), 3GPP TSG-RAN WG2#61bis, R1-1-2995, pp. 1-4, Montreal, Canada, May 10-14, 2010.

* cited by examiner

METHOD AND APPARATUS FOR OPTIMIZING A USER PLAN OPERATION IN A COMMUNICATION SYSTEM BASED ON CARRIER AGGREGATION

FIELD OF THE INVENTION

The present invention relates to a wireless communication system, more particularly, to a wireless communication system based on carrier aggregation (CA).

BACKGROUND OF THE INVENTION

In LTE-A, wider bandwidth, up to 100M will be used to satisfy the higher data rate requirement. For backward compatibility, this 100M bandwidth will be separated into multiple carrier components. Each carrier component has the maximum bandwidth of 20M. Therefore, five carrier components can be used for the user equipments in LTE-A.

Now 3rd Generation Partnership Project has agreed with the application of the downlink carrier component activation/deactivation concept basically. That is, when a base station decides not to use an activated carrier component, it de-activates the downlink carrier component and informs a user equipment to enable the user equipment not to monitor PDCCH on this carrier component so as to achieve the power saving purpose.

Additionally, according to the agreement achieved by 3GPP, the downlink carrier component de-activation/activation command is sent to a user equipment by a MAC CE signaling from a base station.

For the carrier aggregation technology, another important agreement achieved by 3GPP is that for any one of the downlink carrier component/the uplink carrier component, there is a downlink carrier component associated therewith, to be responsible for sending the downlink assignment/uplink grant information of the downlink carrier component/the uplink carrier component. And those associated information is sent to a user equipment through a radio resource control signaling (RRC signaling) from a base station.

From the perspective of a user equipment, there are two events which results that a downlink carrier component is not useable. Event 1: a RRC signaling is received from a base station to indicate that a downlink carrier component is de-configured; Event 2: a MAC CE signaling is received form a base station to indicate that a downlink carrier component is de-activated.

The difference of these two events is that, event 1 means a user equipment will be no longer perform downlink measurement on the de-configured carrier component; and event 2 means a user equipment will still continue to perform mobility relevant measurement on the de-activated downlink carrier component. But the similarity for these two events is that the user equipment will be no longer to monitor PDCCH channel on this downlink carrier component and to execute PDSCH operation, which will result in the occurrence of the following problems:

1) For the downlink carrier component, the user plan operation at the user equipment side will be affected, because the reception related to this downlink carrier component is stopped;

2) If the downlink carrier component is associated with other at least one downlink carrier component/uplink carrier component, for example, the downlink carrier component is responsible for sending downlink assignment/uplink grant information of the at least one associated downlink carrier component and uplink carrier component, then, since the user equipment can no longer receive those downlink assignment/uplink grant information associated with the downlink carrier component and the uplink component, the use of those associated downlink carrier components/uplink carrier components will be affected.

In the prior art, a scheme for reducing the impact on a user plan operation when a downlink carrier component is de-activated is provided. Its main point is that a user equipment delays the de-activation implementation until all pending HARQ transmissions and retransmissions on the de-activated downlink carrier component end when it receives the de-activation command from a base station, so as to avoid data loss and reduce the impact of the HARQ re-ordering procedure. But there are following disadvantages in the scheme, that is, de-synchronization on the de-activated downlink carrier component status between a user equipment and a base station may occur, and the base station has to schedule further transmission on the de-activated carrier component.

DETAILED DESCRIPTION OF THE INVENTION

Based on the problems described above, a method for optimizing a user plan operation in a user equipment of a wireless communication system based on carrier aggregation is provided in an embodiment of the present invention, wherein, the method comprises the following steps: firstly, a user equipment receives a downlink carrier component removal signaling from a base station, wherein the downlink carrier component removal signaling is used to indicate a removed downlink carrier component; secondly, the user equipment, according to the downlink carrier component removal signaling, stops the pending HARQ procedures of the removed downlink carrier component and flushes the HARQ receiving buffer related to the removed downlink carrier component and/or stops a re-ordering procedure and/or generates a status report and sends the status report to the base station, wherein the status report is used to indicate the base station to perform retransmission and inform the base station of the data needed to be retransmitted.

Optionally, when the downlink carrier component removal signaling is a MAC CE signaling, firstly, the user equipment receives the MAC CE signaling from the base station in layer 2, the MAC CE signaling being used to indicate a de-activated downlink carrier component; then the user equipment, according to the MAC CE signaling, indicates layer 1 to stop the pending HARQ procedures of the de-activated downlink carrier component and indicates layer 1 or layer 2 to flush the HARQ receiving buffer related to the de-activated downlink carrier component and/or indicates layer 2 to stop a re-ordering procedure and/or indicates layer 2 to generate a status report and send the status report to the base station, wherein the status report is used to indicate the base station to perform retransmission in layer 2 and inform the base station of the data needed to be retransmitted.

Optionally, when the downlink carrier component removal signaling is a RRC signaling, firstly, the user equipment receives the RRC signaling from the base station in layer 3, the RRC signaling being used to indicate a de-configured downlink carrier component; then the user equipment, according to the RRC signaling, indicates layer 1 to stop the pending HARQ procedures of the de-configured downlink carrier component and indicates layer 1 or layer 2 to flush the HARQ receiving buffer related to the de-configured downlink carrier component and/or indicates layer 2 to stop a re-ordering procedure and/or indicates layer 2 to generate a status report and send the status report to the base station, wherein the status report is used to indicate the base station to perform retransmission in layer 2 and inform the base station of the data needed to be retransmitted.

By applying the above technology scheme, the user plan operation at the user equipment side can be optimized, when a downlink carrier component is de-activated or de-configured.

Optionally, when the de-configured downlink carrier component is further used to send the user equipment downlink assignment information related to at least one associated downlink carrier component associated with the de-configured downlink carrier component and uplink grant information related to at least one associated uplink carrier component associated with the de-configured downlink carrier component, the method further comprising: a user equipment determines whether information about a replaced downlink carrier component is included in the RRC signaling; the user equipment receives the downlink assignment information related to at least one associated downlink carrier component associated with the de-configured downlink carrier component and the uplink grant information related to at least one associated uplink carrier component associated with the de-configured downlink carrier component on the replaced downlink carrier component, if the information about the replaced downlink carrier component is included in the RRC signaling; the user equipment indicates layer 1 to stop relevant measurements performed on the at least one associated downlink carrier component and indicates layer 1 to stop transmitting a sounding reference signal on the at least one associated uplink carrier component, if the information about the replaced downlink carrier components is not included in the RRC signaling; and indicates layer 1 to stop the pending HARQ procedures of the at least one associated downlink carrier component and indicates layer 1 or layer 2 to flush the HARQ receiving buffer related to the at least one associated downlink carrier component and/or indicates layer 2 to stop a re-ordering procedure and/or indicates layer 2 to generate a status report and send the status report to the base station, wherein the status report is used to indicate the base station to perform retransmission and inform the base station of the data needed to be retransmitted; and indicates layer 1 to stop the pending HARQ procedures of the at least one associated uplink carrier component and indicates layer 2 to flush the HARQ receiving buffer related to the at least one associated uplink carrier component, and/or indicates layer 2 to perform retransmission.

Optionally, when the de-activated downlink carrier component is further used to send the user equipment downlink assignment information related to at least one associated downlink carrier component associated with the de-activated downlink carrier component and uplink grant information related to at least one associated uplink carrier component associated with the de-activated downlink carrier component, the method further comprising: a user equipment extracts status information from the received MAC CE signaling, wherein the status information includes the status of at least one associated downlink carrier component associated with the de-activated downlink carrier component; the user equipment indicates layer 1 to stop relevant measurements performed on at least one hit downlink carrier component, if the at least one hit downlink carrier component of the at least one associated downlink carrier component is in the de-activated status; and indicates layer 1 to stop the pending HARQ procedures of the at least one hit downlink carrier component and indicates layer 1 or layer 2 to flush the HARQ receiving buffer related to the at least one hit downlink carrier component and/or indicates layer 2 to stop a re-ordering procedure and/or indicates layer 2 to generate a status report and send the status report to the base station, wherein the status report is used to indicate the base station to perform retransmission and inform the base station of the data needed to be retransmitted.

Optionally, the method further comprises: a user equipment determines whether the status information included in the MAC CE signaling further includes status of at least one associated uplink carrier component associated with the de-activated downlink carrier component, or determines whether status information of the uplink carrier component is received from the base station in the same TTI, the status information of the uplink carrier component includes status of at least one associated uplink component carrier associated with the de-activated downlink carrier component; the user equipment indicates layer 1 to stop transmitting a sounding reference signal on at least one hit uplink carrier component, if the status information included in the MAC CE signaling further includes the status of at least one associated uplink carrier component associated with the de-activated downlink carrier component, or the status information of the uplink carrier component is received from the base station in the same TTI and at least one hit downlink carrier component of the at least one associated downlink carrier component is in the de-activated status; and indicates layer 1 to stop the pending HARQ procedures of the at least one hit uplink carrier component and indicates layer 2 to flush the HARQ receiving buffer related to the at least one hit uplink carrier component, and/or indicates layer 2 to perform retransmission. The user equipment indicates layer 1 to stop transmitting a sounding reference signal on the at least one associated uplink carrier component, if the status information included in the MAC CE signaling does not include the status of at least one associated uplink carrier component associated with the de-activated downlink carrier component, or the status information of the uplink carrier component is not received from the base station in the same TTI; and indicates layer 1 to stop the pending HARQ procedures of the at least one associated uplink carrier component and indicates layer 2 to flush the HARQ receiving buffer related to the at least one associated uplink carrier component, and/or indicates layer 2 to perform retransmission.

By applying the above technology scheme, the user plan operation at the user equipment side can not only be optimized, the impact on at least one associated downlink carrier component and at least one associated uplink carrier component associated with the de-activated/de-configured downlink carrier component can be reduced or eliminated as well.

A method for assisting a user equipment to optimize a user plan operation in a base station of a wireless communication system based on carrier aggregation is provided in another embodiment of the present invention, wherein the method comprises the following steps: firstly a base station re-configures an activated downlink carrier component as a replaced downlink carrier component; then the base station inserts information of the replaced downlink carrier component to a RRC signaling, wherein the RRC signaling is used to indicate a de-configured downlink carrier component and a replaced downlink carrier component, the replaced downlink carrier component is used to replace the de-configured downlink carrier component and send downlink assignment of at least one associated downlink carrier component associated with the de-configured downlink carrier component and uplink grant of at least one associated uplink carrier component associated with the de-configured carrier to the user equipment; finally, the base station sends the RRC signaling to the user equipment.

An optimizing apparatus for optimizing a user plan operation in a user equipment of a wireless communication system based on carrier aggregation is provided in an embodiment of the present invention, wherein the optimizing apparatus comprises: a first receiving means, for receiving a downlink carrier component removal signaling from a base station, wherein the downlink carrier component removal signaling is used to indicate a removed downlink carrier component; a first indicating means, for according to the downlink carrier component removal signaling, stopping the pending HARQ procedures of the removed downlink carrier component and flushing the HARQ receiving buffer related to the removed downlink carrier component and/or stopping a re-ordering procedure and/or generating a status report and sending the status report to the base station, wherein the status report is used to indicate the base station to perform retransmission and inform the base station of the data needed to be retransmitted.

An assisting optimizing apparatus for assisting a user equipment to optimize a user plan operation in a base station of a wireless communication system based on carrier aggregation is provided in another embodiment of the present invention, wherein the assisting optimizing apparatus comprises: a configuring means, for re-configuring an activated downlink carrier component as a replaced downlink carrier component; an inserting means, for inserting information of the replaced downlink carrier component to a RRC signaling, wherein the RRC signaling is used to indicate a de-configured downlink carrier component and a replaced downlink carrier component, the replaced downlink carrier component is used to replace the de-configured downlink carrier component and send downlink assignment of at least one associated downlink carrier component associated with the de-configured downlink carrier component and uplink grant of at least one associated uplink carrier component associated with the de-configured carrier to the user equipment; a sending means, for sending the RRC signaling to the user equipment.

The respective aspects of the present invention will be more apparent through the detailed illustration of the embodiments in the following.

DESCRIPTION OF DRAWINGS

With reference to the following detailed description of the non-restrictive embodiments, other features, objects and advantages of the present invention will be more apparent.

Wherein, through different figures, same or similar reference numerals refer to corresponding features

DETAILED DESCRIPTION OF EMBODIMENTS

With reference to the figures, the technology scheme of the present invention will be described in detail.

Figure 1:
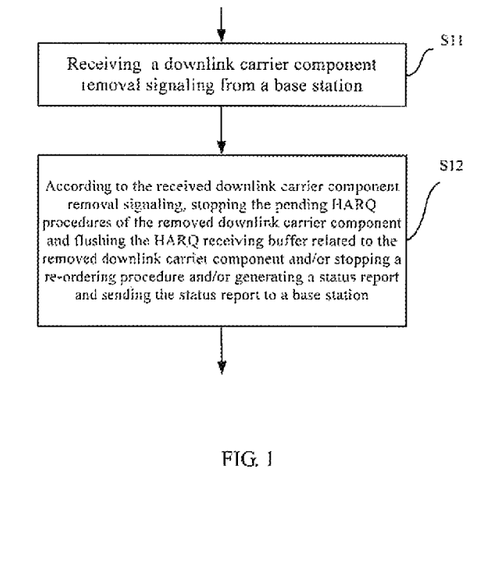
FIG. 1 shows a flow chart of a method for optimizing a user plan operation in a user equipment of a wireless communication system based on carrier aggregation according to an embodiment of the present invention.

FIG. 1 shows a flow chart of a method for optimizing a user plan operation in user equipment 10 of a wireless communication system based on carrier aggregation according to an embodiment of the present invention.

Firstly, in step S11, user equipment 10 receives a downlink carrier component removal signaling from base station 20.

The downlink carrier component removal signaling is used to indicate a removed downlink carrier component. Optionally, the downlink carrier component removal signaling is a MAC CE (MAC control element) signaling, being used to indicate a de-activated downlink carrier component; or the downlink carrier component removal signaling is a RRC signaling, being used to indicate a de-configured downlink carrier component.

Generally, when the downlink data queue at base station 20 side runs empty, base station 20 will de-activate a downlink carrier component. After base station 20 determines to de-activate a downlink carrier component, base station 20 will put the information of the de-activated downlink carrier component into a MAC CE signaling, and send the MAC CE signaling to user equipment 10 through any of the other downlink carrier components in the activated status. After user equipment 10 receives the MAC CE signaling from base station 20, user equipment 10 can know which downlink carrier component is de-activated according to the information of the de-activated downlink carrier component included in the MAC CE signaling.

Then, in step S12, user equipment 10, according to the received downlink carrier component removal signaling, stops the pending HARQ procedures of the removed downlink carrier component and flushes the HARQ receiving buffer related to the removed downlink carrier component and/or stops a re-ordering procedure and/or generates a status report and sends the status report to base station 20. The status report is used to indicate base station 20 to perform retransmission and inform base station 20 of the data needed to be retransmitted.

Since user equipment 10 sends the status report to base station 20 immediately after it receives the downlink carrier component removal signaling, this can trigger base station 20 to perform retransmission early, so as to reduce the impact on QoS due to data loss.

Optionally, when the downlink carrier component removal signaling is a MAC CE signaling, after user equipment 10 receives the MAC CE signaling from base station 20 in layer 2, for example, MAC layer, user equipment 10 indicates layer 1, for example, physical layer, to stop the pending HARQ procedures of the de-activated downlink carrier component and indicates layer 2, for example, MAC layer, to flush the HARQ receiving buffer related to the de-activated downlink carrier component and/or indicates layer 2, for example, RLC layer, to stop a re-ordering procedure and/or indicates layer 2, for example, RLC layer, to generate a status report. The status report is used to indicate base station 20 to perform retransmission in layer 2, for example, RLC layer, and inform base station 20 of the data needed to be retransmitted.

It should be noted, that in the different systems, the HARQ receiving buffer can be located in layer 1, for example, physical layer, or in layer 2, for example, MAC layer. It is understandable for those skilled in the art, that when the HARQ receiving buffer is located in layer 1, for example, physical layer, user equipment 10 indicates the physical layer to flush the HARQ receiving buffer related to the de-activated downlink carrier component; and when the HARQ receiving buffer is located in layer 2, for example, MAC layer, user equipment 10 indicates the MAC layer to flush the HARQ receiving buffer related to the de-activated downlink carrier component.

Optionally, when the downlink carrier component removal signaling is a RRC signaling, after user equipment 10 receives the RCC signaling from base station 20 in layer 3, for example, RCC layer, user equipment 10 indicates layer 1, for example, physical layer, to stop the pending HARQ procedures of the de-configured downlink carrier component and indicates layer 2, for example, MAC layer, to flush the HARQ receiving buffer related to the de-configured downlink carrier component and/or indicates layer 2, for example, RLC layer, to stop a re-ordering procedure and/or indicates layer 2, for example, RLC layer, to generate a status report. The status report is used to indicate base station 20 to perform retransmission in layer 2, for example, RLC layer, and inform base station 20 of the data needed to be retransmitted.

After base station 20 receives the status report from user equipment 10, it performs data retransmission in layer 2, for example, RLC layer, according to the data needed to be retransmitted indicated in the status report.

Certainly, after base station 20 receives the status report from user equipment 10, it can also choose not to perform data retransmission.

In another embodiment, when the downlink carrier component removal signaling is a RRC signaling and the de-configured downlink carrier component is further used to send user equipment 10 downlink assignment information related to at least one associated downlink carrier component associated with the de-configured downlink carrier component and uplink grant information related to at least one associated uplink carrier component associated with the de-configured downlink carrier component, then, after user equipment 10 receives the RRC signaling from base station 20 in layer 3, it determines whether information about a replaced downlink carrier component is included in the RRC signaling.

User equipment 10 indicates layer 1, for example, physical layer, to stop relevant measurements, for example, channel quality indicator (CQI) measurement and/or mobility measurement, performed on the at least one associated downlink carrier component and indicates layer 1 for example, physical layer, to stop transmitting a sounding reference signal (SRS) on the at least one associated uplink carrier component, if the information about the replaced downlink carrier components is not included in the RRC signaling; additionally, user equipment 10 also indicates layer 1, for example, physical layer, to stop the pending HARQ procedures of the at least one associated downlink carrier component and indicates layer 2, for example, MAC layer, to flush the HARQ receiving buffer related to the at least one associated downlink carrier component and/or indicates layer 2, for example, RLC layer, to stop a re-ordering procedure and/or indicates layer 2, for example, RLC layer, to generate a status report and send the status report to base station 20, wherein the status report is used to indicate base station 20 to perform retransmission on layer 2, for example, RLC layer, and inform the base station of the data needed to be retransmitted; and user equipment 10 also indicates layer 1, for example, physical layer, to stop the pending HARQ procedures of the at least one associated uplink carrier component and indicates layer 2, for example MAC layer, to flush the HARQ receiving buffer related to the at least one associated uplink carrier component, and/or indicates layer 2, for example, RLC layer, to perform retransmission.

Optionally, when at least one target downlink carrier component in the at least one associated downlink carrier component is further used to provide reference path loss estimation for other uplink carrier components, user equipment 10 indicates layer 1, for example, physical layer, to perform the reference path loss estimation on the at least one target downlink carrier component.

It should be noted, that the situation in which the information about the replaced downlink carrier components is not included in the RRC signaling mentioned above can include two events, one event, a information field for accommodating the information of a replaced downlink carrier component is configured in the RRC signaling, but base station 20 has not re-configured a downlink carrier component as a replaced downlink carrier component, thus, the information field is, for example, 0; another event, a information field for accommodating the information of the replaced downlink carrier components is not configured in the RRC signaling.

User equipment 10 receives the downlink assignment information related to at least one associated downlink carrier component associated with the de-configured downlink carrier component and the uplink grant information related to at least one associated uplink carrier component associated with the de-configured downlink carrier component on the replaced downlink carrier component, if the information about the replaced downlink carrier component is included in the RRC signaling.

It should be noted, that for the situation, in which, the information about the replaced downlink carrier component is included in the RRC signaling received by user equipment 10, correspondingly, at base station 20 side, base station 20 executes the step of re-configuring a replaced downlink carrier component.

Figure 2:
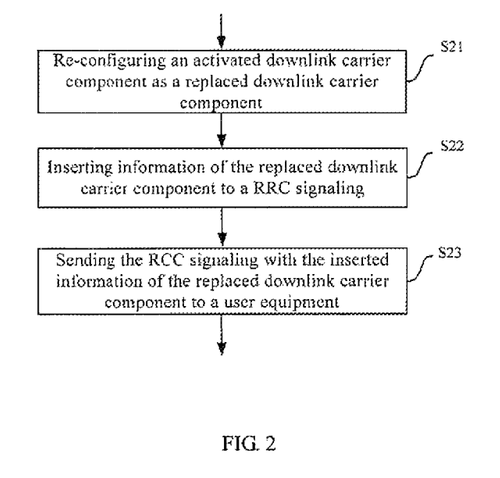
FIG. 2 shows a flow chart of a method for assisting a user equipment to optimize a user plan operation in a base station of a wireless communication system based on carrier aggregation according to an embodiment of the present invention.

More specifically, as shown in FIG. 2, firstly, in step S21, base station 20 re-configures an activated downlink carrier component as a replaced downlink carrier component. For example, base station 20 can select a downlink carrier component with the best channel condition or select a downlink carrier component with the lightest channel capacity as a replaced downlink carrier component.

Then, in step S22, base station 22 inserts information of the replaced downlink carrier component to a RRC signaling. The RRC signaling is used to indicate a de-configured downlink carrier component and a replaced downlink carrier component, and the replaced downlink carrier component is used to replace the de-configured downlink carrier component and send downlink assignment of at least one associated downlink carrier component associated with the de-configured downlink carrier component and uplink grant of at least one associated uplink carrier component associated with the de-configured carrier to user equipment 10.

Finally, in step S23, base station 20 sends the RCC signaling with the inserted information of the replaced downlink carrier component to user equipment 10.

Certainly, in the above embodiments, base station 20 and user equipment 10 can make an appointment in advance that a de-configured carrier component is replaced by a downlink primary carrier component (DL PCC) and downlink assignment information related to at least one associated downlink carrier component associated with the de-configured downlink carrier component and uplink grant information related to at least one associated uplink carrier component associated with the de-configured downlink carrier component is sent to user equipment 10. Based on that, after user equipment 10 receives the RRC signaling from base station 20, user equipment 10 will receive downlink assignment information related to at least one associated downlink carrier component associated with the de-configured downlink carrier component and uplink grant information related to at least one associated uplink carrier component associated with the de-configured downlink carrier component on the downlink primary carrier component according to the appointment in advance.

In another embodiment, when the downlink carrier component removal signaling is a MAC CE signaling and the de-activated downlink carrier component is further used to send user equipment 10 downlink assignment information related to at least one associated downlink carrier component associated with the de-activated downlink carrier component and uplink grant information related to at least one associated uplink carrier component associated with the de-activated downlink carrier component, user equipment 10 extracts status information from the MAC CE signaling after it receives the MAC signaling from base station 20 in layer 2.

It should be noted, that the status information includes the status information of all configured downlink carrier components, certainly also includes the status information of at least one associated downlink carrier component associated with the de-activated downlink carrier component.

The status of at least one associated downlink carrier component is set by base station 20. More specifically, base station 20 can set the at least one associated downlink carrier component all in the de-activated status, or partially in the de-activated status, or all in the activated status.

If the at least one hit downlink carrier component of the at least one associated downlink carrier component is in the de-activated status, user equipment 10 indicates layer 1, for example, physical layer, to stop relevant measurements, for example, channel quality indicator measurement and/or mobility measurement, performed on at least one hit downlink carrier component, and indicates layer 1, for example, physical layer, to stop the pending HARQ procedures of the at least one hit downlink carrier component, and indicates layer 2, for example, MAC layer, to flush the HARQ receiving buffer related to the at least one hit downlink carrier component and/or indicates layer 2, for example, RLC layer, to stop a re-ordering procedure and/or indicates layer 2, for example, RLC layer to generate a status report and send the status report to base station 20, wherein the status report is used to indicate base station 20 to perform retransmission in layer 2, for example, RLC layer and inform base station 20 of the data needed to be retransmitted.

Optionally, when at least one target downlink carrier component in the at least one hit downlink carrier component is further used to provide reference path loss estimation for other uplink carrier components, user equipment 10 further indicates layer 1, for example, physical layer, to perform the reference path loss estimation on the at least one target downlink carrier component.

In the above embodiments, optionally, user equipment 10 continues to determine whether the status information included in the MAC CE signaling further includes status of at least one associated uplink carrier component associated with the de-activated downlink carrier component, or user equipment 10 determines whether status information of the uplink carrier component is received from base station 20 in the same TTI, the status information of the uplink carrier component includes status of at least one associated uplink component carrier associated with the de-activated downlink carrier component.

If the status information included in the MAC CE signaling further includes the status of at least one associated uplink carrier component associated with the de-activated downlink carrier component, or the status information of the uplink carrier component is received from base station 20 in the same TTI and at least one hit downlink carrier component of the at least one associated downlink carrier component is in the de-activated status, user equipment 10 indicates layer 1, for example physical layer, to stop transmitting a sounding reference signal on the at least one hit uplink carrier component, and indicates layer 1, for example, physical layer, to stop the pending HARQ procedures of the at least one hit uplink carrier component and indicates layer 2, for example, MAC layer, to flush the HARQ receiving buffer related to the at least one hit uplink carrier component, and/or indicates layer 2, for example, RLC layer to perform retransmission.

If the status information included in the MAC CE signaling does not include the status of at least one associated uplink carrier component associated with the de-activated downlink carrier component, or the status information of the uplink carrier component is not received from base station 20 in the same TTI, user equipment 10 indicates layer 1, for example, physical layer, to stop transmitting a sounding reference signal on the at least one associated uplink carrier component, and indicates layer 1, for example physical layer, to stop the pending HARQ procedures of the at least one associated uplink carrier component and indicates layer 2, for example, MAC layer to flush the HARQ receiving buffer related to the at least one associated uplink carrier component, and/or indicates layer 2, for example RLC layer to perform retransmission.

The technology scheme of the present invention is described above from the perspective of the method. In the following, the technology scheme of the present invention will be further described from the perspective of the apparatus.

Figure 3:
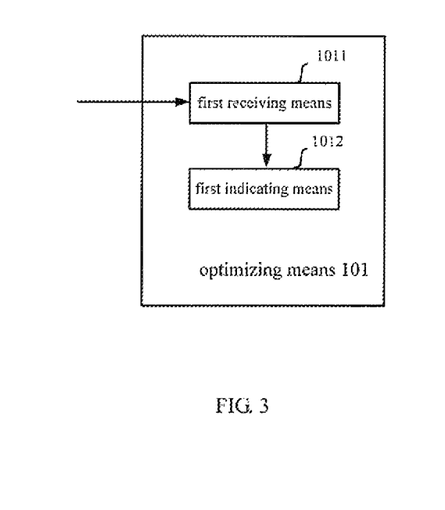
FIG. 3 shows a block diagram of an optimizing apparatus for optimizing a user plan operation in a user equipment of a wireless communication system based on carrier aggregation according to an embodiment of the present invention.

FIG. 3 shows a block diagram of an optimizing apparatus 101 for optimizing a user plan operation in user equipment 10 of a wireless communication system based on carrier aggregation according to an embodiment of the present invention.

Firstly, a first receiving means 1011 in the optimizing apparatus 101 in user equipment 10 receives a downlink carrier component removal signaling from base station 20.

The downlink carrier component removal signaling is used to indicate a removed downlink carrier component. Optionally, the downlink carrier component removal signaling is a MAC CE (MAC control element) signaling, being used to indicate a de-activated downlink carrier component; or the downlink carrier component removal signaling is a RRC signaling, being used to indicate a de-configured downlink carrier component.

Generally, when the downlink data queue at base station 20 side runs empty, base station 20 will de-activate a downlink carrier component. After base station 20 determines to de-activate a downlink carrier component, base station 20 will put the information of the de-activated downlink carrier component into a MAC CE signaling, and send the MAC CE signaling to user equipment 10 through any of the other downlink carrier components in the activated status. After the first receiving means 1011 receives the MAC CE signaling from base station 20, it can know which downlink carrier component is de-activated according to the information of the de-activated downlink carrier component included in the MAC CE signaling.

Then, a first indicating means 1012 in the optimizing apparatus 101 in user equipment 10, according to the received downlink carrier component removal signaling, stops the pending HARQ procedures of the removed downlink carrier component and flushes the HARQ receiving buffer related to the removed downlink carrier component and/or stops a re-ordering procedure and/or generates a status report and sends the status report to base station 20. The status report is used to indicate base station 20 to perform retransmission and inform base station 20 of the data needed to be retransmitted.

Optionally, when the downlink carrier component removal signaling is a MAC CE signaling, after the first receiving means 1011 receives the MAC CE signaling from base station 20 in layer 2, for example, MAC layer, the first indicating means 1012 indicates layer 1, for example, physical layer, to stop the pending HARQ procedures of the de-activated downlink carrier component and indicates layer 2, for example, MAC layer, to flush the HARQ receiving buffer related to the de-activated downlink carrier component and/or indicates layer 2, for example, RLC layer, to stop a re-ordering procedure and/or indicates layer 2, for example, RLC layer, to generate a status report. The status report is used to indicate base station 20 to perform retransmission in layer 2, for example, RLC layer, and inform base station 20 of the data needed to be retransmitted.

It should be noted, that in the different systems, the HARQ receiving buffer can be located in layer 1, for example, physical layer, or in layer 2, for example, MAC layer. It is understandable for those skilled in the art, that when the HARQ receiving buffer is located in layer 1, for example, physical layer, the first indicating means 1012 indicates the physical layer to flush the HARQ receiving buffer related to the de-activated downlink carrier component; and when the HARQ receiving buffer is located in layer 2, for example, MAC layer, the first indicating means 1012 indicates the MAC layer to flush the HARQ receiving buffer related to the de-activated downlink carrier component.

Optionally, when the downlink carrier component removal signaling is a RRC signaling, after the first receiving means 1011 receives the RCC signaling from base station 20 in layer 3, for example, RCC layer, the first indicating means 1012 indicates layer 1, for example, physical layer, to stop the pending HARQ procedures of the de-configured downlink carrier component and indicates layer 2, for example, MAC layer, to flush the HARQ receiving buffer related to the de-configured downlink carrier component and/or indicates layer 2, for example, RLC layer, to stop a re-ordering procedure and/or indicates layer 2, for example, RLC layer, to generate a status report. The status report is used to indicate base station 20 to perform retransmission in layer 2, for example, RLC layer, and inform base station 20 of the data needed to be retransmitted.

After base station 20 receives the status report from user equipment 10, it performs data retransmission in layer 2, for example, RLC layer, according to the data needed to be retransmitted indicated in the status report.

Certainly, after base station 20 receives the status report from user equipment 10, it can also choose not to perform data retransmission.

In another embodiment, when the downlink carrier component removal signaling is a RRC signaling and the de-configured downlink carrier component is further used to send user equipment 10 downlink assignment information related to at least one associated downlink carrier component associated with the de-configured downlink carrier component and uplink grant information related to at least one associated uplink carrier component associated with the de-configured downlink carrier component, then, after the first receiving means 1011 receives the RRC signaling from base station 20 in layer 3, a first determining means (not shown in FIG. 3 for the purpose of simplicity) determines whether information about a replaced downlink carrier component is included in the RRC signaling.

A second indicating means (not shown in FIG. 3 for the purpose of simplicity) in the optimizing apparatus 101 in user equipment 10 indicates layer 1, for example, physical layer, to stop relevant measurements, for example, channel quality indicator (CQI) measurement and/or mobility measurement, performed on the at least one associated downlink carrier component and indicates layer 1 for example, physical layer, to stop transmitting a sounding reference signal (SRS) on the at least one associated uplink carrier component, if the information about the replaced downlink carrier components is not included in the RRC signaling; additionally, the second indicating means also indicates layer 1, for example, physical layer, to stop the pending HARQ procedures of the at least one associated downlink carrier component and indicates layer 2, for example, MAC layer, to flush the HARQ receiving buffer related to the at least one associated downlink carrier component and/or indicates layer 2, for example, RLC layer, to stop a re-ordering procedure and/or indicates layer 2, for example, RLC layer, to generate a status report and send the status report to base station 20, wherein the status report is used to indicate base station 20 to perform retransmission on layer 2, for example, RLC layer, and inform the base station of the data needed to be retransmitted; and the second indicating means also indicates layer 1, for example, physical layer, to stop the pending HARQ procedures of the at least one associated uplink carrier component and indicates layer 2, for example MAC layer, to flush the HARQ receiving buffer related to the at least one associated uplink carrier component, and/or indicates layer 2, for example, RLC layer, to perform retransmission.

Optionally, when at least one target downlink carrier component in the at least one associated downlink carrier component is further used to provide reference path loss estimation for other uplink carrier components, the second indicating means indicates layer 1, for example, physical layer, to perform the reference path loss estimation on the at least one target downlink carrier component.

It should be noted, that the situation in which the information about the replaced downlink carrier components is not included in the RRC signaling mentioned above can include two events, one event, a information field for accommodating the information of a replaced downlink carrier component is configured in the RRC signaling, but base station 20 has not re-configured a downlink carrier component as a replaced downlink carrier component, thus, the information field is, for example, 0; another event, a information field for accommodating the information of the replaced downlink carrier components is not configured in the RRC signaling.

A second receiving means (not shown in FIG. 3 for the purpose of simplicity) in the optimizing apparatus 101 in user equipment 10 receives the downlink assignment information related to at least one associated downlink carrier component associated with the de-configured downlink carrier component and the uplink grant information related to at least one associated uplink carrier component associated with the de-configured downlink carrier component on the replaced downlink carrier component, if the information about the replaced downlink carrier component is included in the RRC signaling.

It should be noted, that for the situation, in which, the information about the replaced downlink carrier component is included in the RRC signaling received by the first receiving means 1011, correspondingly, at base station 20 side, base station 20 executes the step of re-configuring a replaced downlink carrier component.

Figure 4:
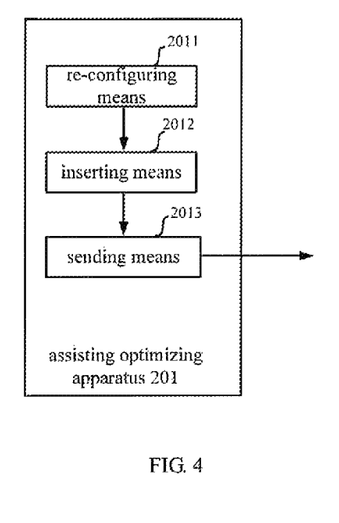
FIG. 4 shows a block diagram of an assisting optimizing apparatus for assisting a user equipment to optimize a user plan operation in a base station of a wireless communication system based on carrier aggregation according to an embodiment of the present invention.

More specifically, as shown in FIG. 4, firstly, a re-configuring means 2011 in an assisting optimizing apparatus 201 in base station 20 re-configures an activated downlink carrier component as a replaced downlink carrier component. For example, the re-configuring means 2011 can select a downlink carrier component with the best channel condition or select a downlink carrier component with the lightest channel capacity as a replaced downlink carrier component.

Then, an inserting means 2012 in the assisting optimizing apparatus 201 in base station 22 inserts information of the replaced downlink carrier component to a RRC signaling. The RRC signaling is used to indicate a de-configured downlink carrier component and a replaced downlink carrier component, and the replaced downlink carrier component is used to replace the de-configured downlink carrier component and send downlink assignment of at least one associated downlink carrier component associated with the de-configured downlink carrier component and uplink grant of at least one associated uplink carrier component associated with the de-configured carrier to user equipment 10.

Finally, a sending means 2012 in the assisting optimizing apparatus 201 in base station 20 sends the RCC signaling with the inserted information of the replaced downlink carrier component to user equipment 10.

Certainly, in the above embodiments, base station 20 and user equipment 10 can make an appointment in advance that a de-configured carrier component is replaced by a downlink primary carrier component (DL PCC) and downlink assignment information related to at least one associated downlink carrier component associated with the de-configured downlink carrier component and uplink grant information related to at least one associated uplink carrier component associated with the de-configured downlink carrier component is sent to user equipment 10. Based on that, after the first receiving means 1011 receives the RRC signaling from base station 20, the second receiving means will receive downlink assignment information related to at least one associated downlink carrier component associated with the de-configured downlink carrier component and uplink grant information related to at least one associated uplink carrier component associated with the de-configured downlink carrier component on the downlink primary carrier component according to the appointment in advance.

In another embodiment, when the downlink carrier component removal signaling is a MAC CE signaling and the de-activated downlink carrier component is further used to send user equipment 10 downlink assignment information related to at least one associated downlink carrier component associated with the de-activated downlink carrier component and uplink grant information related to at least one associated uplink carrier component associated with the de-activated downlink carrier component, an extracting means (not shown in FIG. 3 for the purpose of simplicity) in the optimizing apparatus 101 in user equipment 10 extracts status information from the MAC CE signaling after the first receiving means 1011 receives the MAC signaling from base station 20 in layer 2.

It should be noted, that the status information includes the status information of all configured downlink carrier components, certainly also includes the status information of at least one associated downlink carrier component associated with the de-activated downlink carrier component.

The status of at least one associated downlink carrier component is set by base station 20. More specifically, base station 20 can set the at least one associated downlink carrier component all in the de-activated status, or partially in the de-activated status, or all in the activated status.

If the at least one hit downlink carrier component of the at least one associated downlink carrier component is in the de-activated status, a third indicating means (not shown in FIG. 3 for the purpose of simplicity) in the optimizing apparatus 101 in user equipment 10 indicates layer 1, for example, physical layer, to stop relevant measurements, for example, channel quality indicator measurement and/or mobility measurement, performed on at least one hit downlink carrier component, and indicates layer 1, for example, physical layer, to stop the pending HARQ procedures of the at least one hit downlink carrier component, and indicates layer 2, for example, MAC layer, to flush the HARQ receiving buffer related to the at least one hit downlink carrier component and/or indicates layer 2, for example, RLC layer, to stop a re-ordering procedure and/or indicates layer 2, for example, RLC layer to generate a status report and send the status report to base station 20, wherein the status report is used to indicate base station 20 to perform retransmission in layer 2, for example, RLC layer and inform base station 20 of the data needed to be retransmitted.

Optionally, when at least one target downlink carrier component in the at least one hit downlink carrier component is further used to provide reference path loss estimation for other uplink carrier components, user equipment 10 further indicates layer 1, for example, physical layer, to perform the reference path loss estimation on the at least one target downlink carrier component.

In the above embodiments, optionally, the determining means (not shown in FIG. 3 for the purpose of simplicity) in the optimizing apparatus 101 in user equipment 10 continues to determine whether the status information included in the MAC CE signaling further includes status of at least one associated uplink carrier component associated with the de-activated downlink carrier component, or user equipment 10 determines whether status information of the uplink carrier component is received from base station 20 in the same TTI, the status information of the uplink carrier component includes status of at least one associated uplink component carrier associated with the de-activated downlink carrier component.

If the status information included in the MAC CE signaling further includes the status of at least one associated uplink carrier component associated with the de-activated downlink carrier component, or the status information of the uplink carrier component is received from base station 20 in the same TTI and at least one hit downlink carrier component of the at least one associated downlink carrier component is in the de-activated status, a fourth indicating means (not shown in FIG. 3 for the purpose of simplicity) in the optimizing apparatus 101 in user equipment 10 indicates layer 1, for example physical layer, to stop transmitting a sounding reference signal on the at least one hit uplink carrier component, and indicates layer 1, for example, physical layer, to stop the pending HARQ procedures of the at least one hit uplink carrier component and indicates layer 2, for example, MAC layer, to flush the HARQ receiving buffer related to the at least one hit uplink carrier component, and/or indicates layer 2, for example, RLC layer to perform retransmission.

If the status information included in the MAC CE signaling does not include the status of at least one associated uplink carrier component associated with the de-activated downlink carrier component, or the status information of the uplink carrier component is not received from base station 20 in the same TTI, the fourth indicating means indicates layer 1, for example, physical layer, to stop transmitting a sounding reference signal on the at least one associated uplink carrier component, and indicates layer 1, for example physical layer, to stop the pending HARQ procedures of the at least one associated uplink carrier component and indicates layer 2, for example, MAC layer to flush the HARQ receiving buffer related to the at least one associated uplink carrier component, and/or indicates layer 2, for example RLC layer to perform retransmission.

It is intelligible to those skilled in the art that, the present invention is not limited to the details of the embodiments described above. And the present invention can be implemented in other concrete forms without deviating the spirit or basic features of the present invention. Therefore, from any perspective, the embodiments should be considered as exemplary but not limited. The scope of the present invention is defined by the claims but not the specification above, so as to let the present invention include all the variation which falls in to the definition and the scope of the equivalent condition of the claims. Any drawings indicator in the claims should not be understood as the limitation to the protection scope. Further, term "include" does not exclude other units or steps, singular does not exclude plural. A plurality of units or apparatuses described in the system claims can also be implemented by one unit or apparatus via software of hardware. Terms "first" and "second" are used to indicate name other than any specific order.

The invention claimed is:

1. A method for optimizing a user plan operation in a user equipment of a wireless communication system based on carrier aggregation, wherein the method comprises:
receiving a downlink carrier component removal signaling from a base station, wherein the downlink carrier component removal signaling is used to indicate a removed downlink carrier component;
according to the downlink carrier component removal signaling, stopping pending Hybrid Automatic Repeat Request (HARQ) procedures of the removed downlink carrier component and flushing the HARQ receiving buffer related to the removed downlink carrier component and/or stopping a re-ordering procedure and/or generating a status report and sending the status report to the base station, wherein the status report is used to indicate the base station to perform retransmission and inform the base station of the data needed to be retransmitted.

2. The method according to claim 1, wherein the downlink carrier component removal signaling is a media access control control element (MAC CE) signaling, wherein,
the receiving comprises: receiving the MAC CE signaling from the base station in layer 2, the MAC CE signaling being used to indicate a de-activated downlink carrier component;
the stopping comprises: according to the MAC CE signaling, indicating layer 1 to stop the pending HARQ procedures of the de-activated downlink carrier component and indicating layer 1 or layer 2 to flush the HARQ receiving buffer related to the de-activated downlink carrier component and/or indicating layer 2 to stop a re-ordering procedure and/or indicating layer 2 to generate a status report and send the status report to the base station, wherein the status report is used to indicate the base station to perform retransmission in layer 2 and inform the base station of the data needed to be retransmitted.

3. The method according to claim 1, wherein the downlink carrier component removal signaling is radio resource control (RRC) signaling, wherein,
the receiving comprises: receiving the RRC signaling from the base station in layer 3, the RRC signaling being used to indicate a de-configured downlink carrier component;
the stopping comprises: according to the RRC signaling, indicating layer 1 to stop the pending HARQ procedures of the de-configured downlink carrier component and indicating layer 1 or layer 2 to flush the HARQ receiving buffer related to the de-configured downlink carrier component and/or indicating layer 2 to stop a re-ordering procedure and/or indicating layer 2 to generate a status report and send the status report to the base station, wherein the status report is used to indicate the base station to perform retransmission in layer 2 and inform the base station of the data needed to be retransmitted.

4. The method according to claim 3, wherein when the de-configured downlink carrier component is further used to send the user equipment downlink assignment information related to at least one associated downlink carrier component associated with the de-configured downlink carrier component and uplink grant information related to at least one associated uplink carrier component associated with the de-configured downlink carrier component, the method further comprising:
determining whether information about a replaced downlink carrier component is included in the RRC signaling;
receiving the downlink assignment information related to at least one associated downlink carrier component associated with the de-configured downlink carrier component and the uplink grant information related to at least one associated uplink carrier component associated with the de-configured downlink carrier component on the replaced downlink carrier component, if the information about the replaced downlink carrier component is included in the RRC signaling;
indicating layer 1 to stop relevant measurements performed on the at least one associated downlink carrier component and indicating layer 1 to stop transmitting a sounding reference signal on the at least one associated uplink carrier component, if the information about the replaced downlink carrier components is not included in the RRC signaling; and
indicating layer 1 to stop the pending HARQ procedures of the at least one associated downlink carrier component and indicating layer 1 or layer 2 to flush the HARQ receiving buffer related to the at least one associated downlink carrier component and/or indicating layer 2 to stop a re-ordering procedure and/or indicating layer 2 to generate a status report and send the status report to the base station, wherein the status report is used to indicate the base station to perform retransmission and inform the base station of the data needed to be retransmitted; and
indicating layer 1 to stop the pending HARQ procedures of the at least one associated uplink carrier component and indicating layer 2 to flush the HARQ receiving buffer related to the at least one associated uplink carrier component, and/or indicating layer 2 to perform retransmission.

5. The method according to claim 4, wherein when at least one target downlink carrier component in the at least one associated downlink carrier component is further used to provide reference path loss estimation for other uplink carrier components, the indicating layer 1 to stop relevant measurements further comprises: indicating layer 1 to perform the reference path loss estimation on the at least one target downlink carrier component.

6. The method according to claim 2, wherein when the de-activated downlink carrier component is further used to send the user equipment downlink assignment information related to at least one associated downlink carrier component associated with the de-activated downlink carrier component and uplink grant information related to at least one associated uplink carrier component associated with the de-activated downlink carrier component, the method further comprising:

extracting status information from the received MAC CE signaling, wherein the status information includes the status of at least one associated downlink carrier component associated with the de-activated downlink carrier component;

if the at least one hit downlink carrier component of the at least one associated downlink carrier component is in the de-activated status, indicating layer 1 to stop relevant measurements performed on at least one hit downlink carrier component; and indicating layer 1 to stop the pending HARQ procedures of the at least one hit downlink carrier component and indicating layer 1 or layer 2 to flush the HARQ receiving buffer related to the at least one hit downlink carrier component and/or indicating layer 2 to stop a re-ordering procedure and/or indicating layer 2 to generate a status report and send the status report to the base station, wherein the status report is used to indicate the base station to perform retransmission and inform the base station of the data needed to be retransmitted.

7. The method according to claim 6, wherein the method further comprises:

determining whether the status information included in the MAC CE signaling further includes status of at least one associated uplink carrier component associated with the de-activated downlink carrier component, or determining whether status information of the uplink carrier component is received from the base station in the same TTI, the status information of the uplink carrier component includes status of at least one associated uplink component carrier associated with the de-activated downlink carrier component;

if the status information included in the MAC CE signaling further includes the status of at least one associated uplink carrier component associated with the de-activated downlink carrier component, or the status information of the uplink carrier component is received from the base station in the same TTI and at least one hit downlink carrier component of the at least one associated downlink carrier component is in the de-activated status, indicating layer 1 to stop transmitting a sounding reference signal on at least one hit uplink carrier component; and indicating layer 1 to stop the pending HARQ procedures of the at least one hit uplink carrier component and indicating layer 2 to flush the HARQ receiving buffer related to the at least one hit uplink carrier component, and/or indicating layer 2 to perform retransmission;

if the status information included in the MAC CE signaling does not include the status of at least one associated uplink carrier component associated with the de-activated downlink carrier component, or the status information of the uplink carrier component is not received from the base station in the same TTI, indicating layer 1 to stop transmitting a sounding reference signal on the at least one associated uplink carrier component; and indicating layer 1 to stop the pending HARQ procedures of the at least one associated uplink carrier component and indicating layer 2 to flush the HARQ receiving buffer related to the at least one associated uplink carrier component, and/or indicating layer 2 to perform retransmission.

8. The method according to claim 6, wherein when at least one target downlink carrier component in the at least one hit downlink carrier component is further used to provide reference path loss estimation for other uplink carrier components, the step P further comprising: indicating layer 1 to perform the reference path loss estimation on the at least one target downlink carrier component.

9. A method for assisting a user equipment to optimize a user plan operation in a base station of a wireless communication system based on carrier aggregation, wherein the method comprises:

re-configuring an activated downlink carrier component as a replaced downlink carrier component;

inserting information of the replaced downlink carrier component to radio resource control (RRC) signaling, wherein the RRC signaling is used to indicate a de-configured downlink carrier component and a replaced downlink carrier component, the replaced downlink carrier component is used to replace the de-configured downlink carrier component and send downlink assignment of at least one associated downlink carrier component associated with the de-configured downlink carrier component and uplink grant of at least one associated uplink carrier component associated with the de-configured carrier to the user equipment; and sending the RRC signaling to the user equipment.

10. An optimizing apparatus for optimizing a user plan operation in a user equipment of a wireless communication system based on carrier aggregation, wherein the optimizing apparatus comprises:

at least one processor configured as:

a first receiver for receiving a downlink carrier component removal signaling from a base station, wherein the downlink carrier component removal signaling is used to indicate a removed downlink carrier component; and a first indicator for, according to the downlink carrier component removal signaling, stopping pending Hybrid Automatic Repeat Request (HARQ) procedures of the removed downlink carrier component and flushing the HARQ receiving buffer related to the removed downlink carrier component and/or stopping a re-ordering procedure and/or generating a status report and sending the status report to the base station, wherein the status report is used to indicate the base station to perform retransmission and inform the base station of the data needed to be retransmitted.

11. The optimizing apparatus according to claim 10, wherein the downlink carrier component removal signaling is a media access control control element (MAC CE) signaling, wherein, the first receiver is used for receiving the MAC CE signaling from the base station in layer 2, the MAC CE signaling being used to indicate a de-activated downlink carrier component; and the first indicator is used for according to the MAC CE signaling, indicating layer 1 to stop the pending HARQ procedures of the de-activated downlink carrier component and indicating layer 1 or layer 2 to flush the HARQ receiving buffer related to the de-activated downlink carrier component and/or indicating layer 2 to stop a re-ordering procedure and/or indicating layer 2 to generate a status report and send the status report to the base station, wherein the status report is used to indicate the base station to perform retransmission in layer 2 and inform the base station of the data needed to be retransmitted.

12. The optimizing apparatus according to claim 10, wherein the downlink carrier component removal signaling is radio resource control (RRC) signaling, wherein,
- the first receiver is additionally for receiving the RRC signaling from the base station in layer 3, the RRC signaling being used to indicate a de-configured downlink carrier component;
- the first indicator is additionally for, according to the RRC signaling, indicating layer 1 to stop the pending HARQ procedures of the de-configured downlink carrier component and indicating layer 1 or layer 2 to flush the HARQ receiving buffer related to the de-configured downlink carrier component and/or indicating layer 2 to stop a re-ordering procedure and/or indicating layer 2 to generate a status report and send the status report to the base station, wherein the status report is used to indicate the base station to perform retransmission in layer 2 and inform the base station of the data needed to be retransmitted.

13. The optimizing apparatus according to claim 12, wherein when the de-configured downlink carrier component is further used to send the user equipment downlink assignment information related to at least one associated downlink carrier component associated with the de-configured downlink carrier component and uplink grant information related to at least one associated uplink carrier component associated with the de-configured downlink carrier component, the at least one processor further configured as:
- a first determiner for determining whether information about a replaced downlink carrier component is included in the RRC signaling;
- a second receiver for receiving the downlink assignment information related to at least one associated downlink carrier component associated with the de-configured downlink carrier component and the uplink grant information related to at least one associated uplink carrier component associated with the de-configured downlink carrier component on the replaced downlink carrier component, if the information about the replaced downlink carrier component is included in the RRC signaling;
- a second indicator for indicating layer 1 to stop relevant measurements performed on the at least one associated downlink carrier component and indicating layer 1 to stop transmitting a sounding reference signal on the at least one associated uplink carrier component, if the information about the replaced downlink carrier components is not included in the RRC signaling; and indicating layer 1 to stop the pending HARQ procedures of the at least one associated downlink carrier component and indicating layer 1 or layer 2 to flush the HARQ receiving buffer related to the at least one associated downlink carrier component and/or indicating layer 2 to stop a re-ordering procedure and/or indicating layer 2 to generate a status report and send the status report to the base station, wherein the status report is used to indicate the base station to perform retransmission and inform the base station of the data needed to be retransmitted; and indicating layer 1 to stop the pending HARQ procedures of the at least one associated uplink carrier component and indicating layer 2 to flush the HARQ receiving buffer related to the at least one associated uplink carrier component, and/or indicating layer 2 to perform retransmission.

14. The optimizing apparatus according to claim 11, wherein when the de-activated downlink carrier component is further used to send the user equipment downlink assignment information related to at least one associated downlink carrier component associated with the de-activated downlink carrier component and uplink grant information related to at least one associated uplink carrier component associated with the de-activated downlink carrier component, the at least one processor further configured as:
- an extractor for extracting status information from the received MAC CE signaling, wherein the status information includes the status of at least one associated downlink carrier component associated with the de-activated downlink carrier component;
- a third indicator for, if the at least one hit downlink carrier component of the at least one associated downlink carrier component is in the de-activated status, indicating layer 1 to stop relevant measurements performed on at least one hit downlink carrier component and indicating layer 1 to stop the pending HARQ procedures of the at least one hit downlink carrier component and indicating layer 1 or layer 2 to flush the HARQ receiving buffer related to the at least one hit downlink carrier component and/or indicating layer 2 to stop a re-ordering procedure and/or indicating layer 2 to generate a status report and send the status report to the base station, wherein the status report is used to indicate the base station to perform retransmission and inform the base station of the data needed to be retransmitted.

15. An assisting optimizing apparatus for assisting a user equipment to optimize a user plan operation in a base station of a wireless communication system based on carrier aggregation, wherein the assisting optimizing apparatus comprises:
- at least one processor configured as:
  - a configurator for re-configuring an activated downlink carrier component as a replaced downlink carrier component;
  - an inserter for inserting information of the replaced downlink carrier component to radio resource control (RRC) signaling, wherein the RRC signaling is used to indicate a de-configured downlink carrier component and a replaced downlink carrier component, the replaced downlink carrier component is used to replace the de-configured downlink carrier component and send downlink assignment of at least one associated downlink carrier component associated with the de-configured downlink carrier component and uplink grant of at least one associated uplink carrier component associated with the de-configured carrier to the user equipment; and
  - a transmitter for sending the RRC signaling to the user equipment.

* * * * *